F. BERARDI.
DEVICE FOR THE DISTRIBUTION OF WATER IN WATER CLOSETS AND THE LIKE.
APPLICATION FILED NOV. 27, 1911.
1,018,231.
Patented Feb. 20, 1912.
3 SHEETS—SHEET 1.
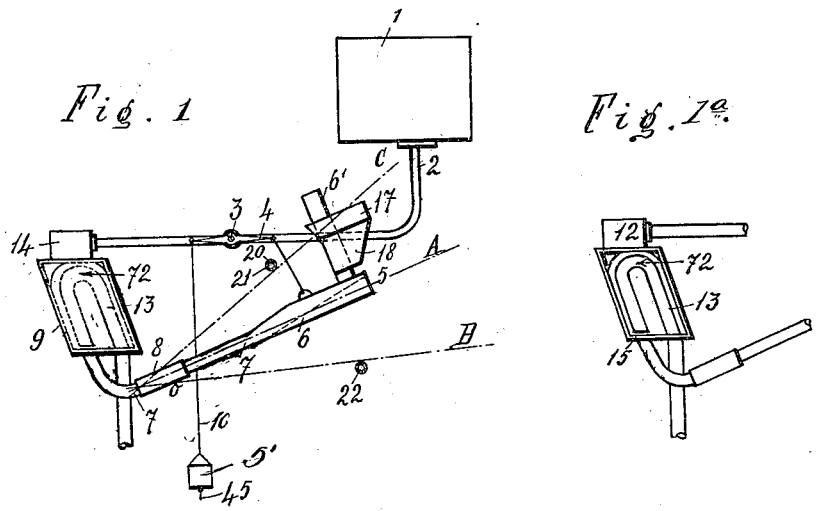

F. BERARDI.
DEVICE FOR THE DISTRIBUTION OF WATER IN WATER CLOSETS AND THE LIKE.
APPLICATION FILED NOV. 27, 1911.
1,018,231.
Patented Feb. 20, 1912.
3 SHEETS—SHEET 2.
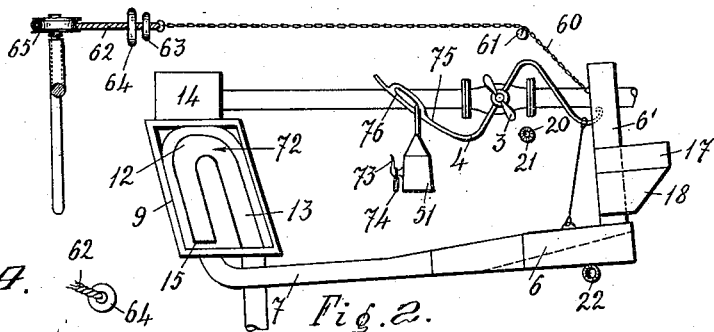
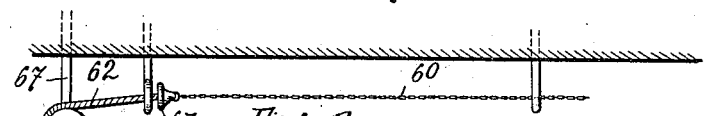
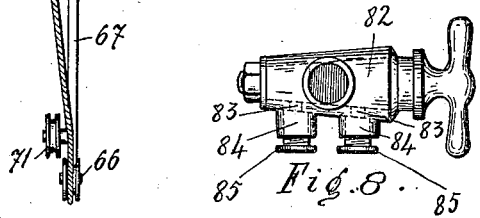
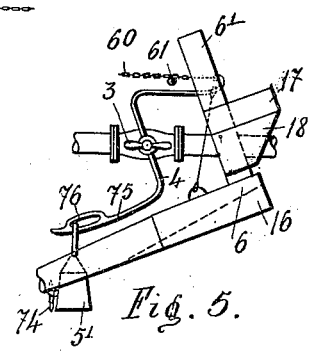
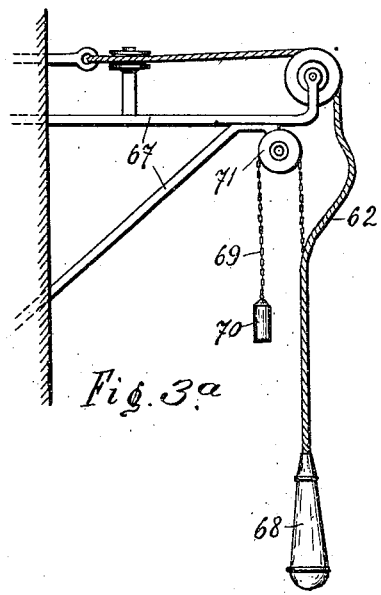
Witnesses.
Inventor
F. Berardi.
By F. BERARDI.
DEVICE FOR THE DISTRIBUTION OF WATER IN WATER CLOSETS AND THE LIKE.
APPLICATION FILED NOV. 27, 1911.

1,018,231.

Patented Feb. 20, 1912.

3 SHEETS—SHEET 3.

Witnesses.

Inventor
F. Berardi
By ........ Atty.

UNITED STATES PATENT OFFICE.

FORTUNATO BERARDI, OF NAPLES, ITALY.

DEVICE FOR THE DISTRIBUTION OF WATER IN WATER-CLOSETS AND THE LIKE.

1,018,231. Specification of Letters Patent. Patented Feb. 20, 1912.

Application filed November 27, 1911. Serial No. 662,693.

*To all whom it may concern:*

Be it known that I, FORTUNATO BERARDI, a subject of the King of Italy, and residing at 6 Via Chiatamone, Naples, Italy, have invented certain new and useful Improvements in Devices for the Distribution of Water in Water-Closets and the Like, of which the following is a specification.

The object of the present invention is a device for the distribution of water in water-closets, by which the water, descending from a very small height, such as that in the carriages of railway trains, is under such strong pressure that even a minimum quantity is sufficient for the cleansing and flushing of bowls with siphon tubes and the contemporaneous automatic clearance of the impure air of the water-closet. This system may be adapted to water-closets in railway trains and marine vessels, all the inconveniences which might derive from the inevitable oscillations o rolling having been provided for and overcome.

The invention is illustrated in the accompanying drawings in which—

Figure 7:
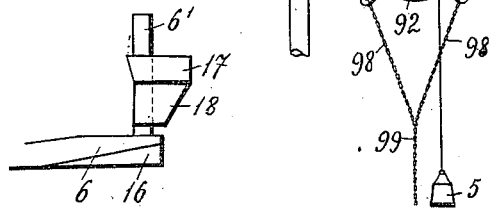
Figure 6:
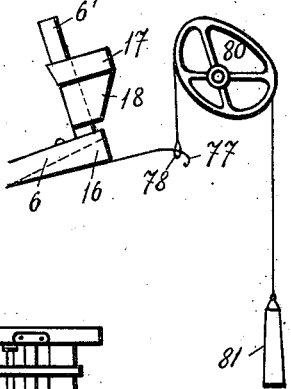
Figure 9A:
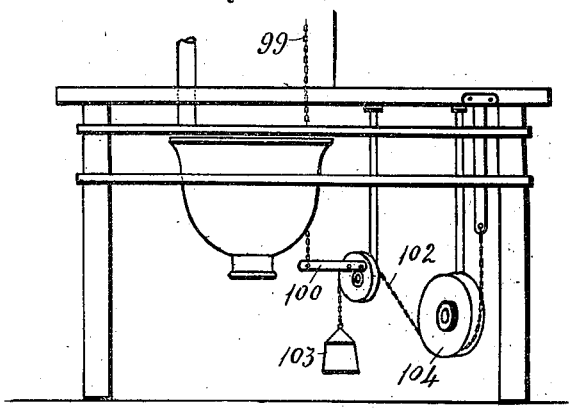

Figure 1 is a side elevation of the hydraulic device in one of its forms; Fig. 1ᵃ is a detail view of the siphon tube of said device; Fig. 2 shows the hydraulic device arranged for manual operation; Figs. 3 and 3ᵃ are views of the hand pull device; Fig. 4 illustrates a detail of said device; Figs. 5 and 6 illustrate embodiments of the invention wherein the lifting of the hydraulic counterpoise is rendered easier in the beginning; Fig. 7 is a fragmentary view of the hydraulic device. Fig. 8 illustrates means for preventing the key for the admission of water from becoming stopped up; and Figs. 9 and 9ᵃ are side elevations of an embodiment of the invention particularly designed for use in marine vessels.

A water tank —1— (Fig. 1) open on the floor above allows the water to flow into the reservoir —9— by means of the pipe —2— furnished with a turn plug —3— which opens and closes automatically as will be explained farther on, by means of the counterpoises —5— —5'— attached to the ends of the double lever —4—. One of these counterpoises —5— is constituted by a receiver —6— furnished with an aerator —6'— and communicating with the reservoir 9 by means of the pipe 7. The metal pipe —7— is in two pieces joined together by a rubber tube —8— which allows the receiver to rise and fall by the closing and opening of the plug or key 3. The various positions which the receiver —6— assumes during the working are indicated in Fig. 1, that indicated by the line O—A being the normal position of the counterpoise 5 to maintain the water in the reservoir 9 at the level —72—, that indicated by O—B corresponding to the closing of the key —3— and that indicated by O—C corresponding to the discharge of the reservoir —9— by means of the drawing up of the counterpoise —5'— by the cord —10—.

The reason for the automatic closing movement lies in the fact that the receiver —6— being in communication by means of the pipe —7— with the reservoir —9— becomes filled with water at the same time as the reservoir itself, so that when the receiver —6— is in the position O—A, and the level of the water coming from the tank —1— has reached the normal level —72— in the reservoir —9— the receiver —6—, on account of the water contained in it, is heavier than the counterpoise —5— and therefore drops down into the position O—B closing the key —3— and thus arresting the flow of the water into the reservoir —9—. If, instead, the cord —10— be pulled, the receiver rises into position O—C and, emptying itself, becomes lighter and acts so that the key —3— remains open until the working described above of the filling and closing takes place again. The water that flows out of the receiver —6— when the cord —10— is pulled passes by means of the pipe —7— into the reservoir —9— raising the level in the latter and by that means causing the discharge of the same by means of the siphon pipe —13—. The key —3— may be eased with a suitable lubricant, as will be explained farther on, although this is really superfluous on account of the very slight rubbing due to the extremely low pressure.

In insuring the action of the discharge and its considerable pressure, the following features take part:

1. The form of the siphon pipe —13— (Fig. 1) which is flattened in the angle —12— although in its greatest width its section is the same as that of the two branches of the said siphon pipe, which flattening allows the water to pass the top of the siphon pipe more rapidly.

2. The upper part of the reservoir —9— made with a minimum space over the siphon pipe with a curb in the form of a little tower and with a reduction at the little turn —14— which so acts that the water rises rapidly by the smaller free surface.

3. And mainly (Fig. 1ª) in order to obtain a rapid working, the disposition of the pipe —7— the end of which is in front of the opening of the siphon pipe —11— with the exception of a short interruption —15—. The raising of the receiver causing a pressure in the water that is discharged from it, acts so that the same rising rapidly is passed into the siphon pipe and through the angle passing into its descending arm in order to obtain a greater pressure contemporaneously with the raising of its level.

4. The form of the hydraulic counterpoise, the outer involucre of the base of which is cylindrical, a part —16— of it remaining entirely empty of water and a frame —17— placed around the aerator, in respect to which it is mounted eccentrically in such a way that it remains displaced from the opposite side of the receiver —6— in respect to the said aerator. This frame is attached to a conical receiver —18— which connects it to the pipe or receiver —6—.

In order that the ascending and descending movement of the receiver —6— may be limited there are two stopping points, one for the ascent —20— furnished with the rubber —21— to deaden the shock produced by the traction of the cord 10, and the other —22— for arresting the descent of the receiver into the position O—B.

To control the siphon pipe by hand, the device shown in Figs. 2, 3, and 4 may be made use of. As will be seen in Fig. 2 the end of the lever —4— from which hangs the hydraulic counterpoise —6— is attached in this embodiment to a chain —60— which resting on a support —61— is joined to a rope —62— at the beginning of which there is a knot or enlargement —63—. This knot in the pulling is resisted by an arresting ring —64— fixed in the wall as seen in Fig. 4 so that the extent of the pulling is limited, and there is no danger that a too energetic tug may injure the pulling device attached to it. The rope —62— then passes around suitable return pulleys, a horizontal one —65— and a vertical one —66— poised on suitable supports —67— (see Figs. 3 and 3ª) ending in a handle —68—. In order that the hydraulic receiver —6— may be ready for a new descent after being filled, the small chain —60— must be slackened. The small chain —69— (Fig. 3ª) which is attached to the rope —62— and held tight by a counterpoise —70— passing over the pulley —71— provides for this purpose. As soon as the rope —62— is freed after a working of the siphon pipe, it is immediately freed by the above mentioned counterpoise —70— which slackens it. The water must not descend into the before mentioned receiver below a given level indicated for instance by the arrows —72— in Fig. 2 in order that too much water may not be needed to start the siphon pipe. It is on the contrary advisable that this level be indicated in such a way as to be easily controlled, by arranging a piece of transparent glass in a portion of the wall of the tank at the corresponding height, on which the said arrow may be indicated with a metallic wire. Experience has shown that generally speaking this remains constant for a long time. It might vary, however, through a too sudden or too slow descent of the hydraulic counterpoise —6—. This rapidity of descent may be caused by a decrease in the force necessary for turning the key —3— (decrease due to the contraction of the metal through cold, wearing out, etc., or through the expansion of the metal or oxidation). In order to avoid these inconveniences I have projected various ways of carrying out some means for preventing the too sudden descent of the hydraulic counterpoise —6—, as also the too slow descent of the same.

Figure 9:
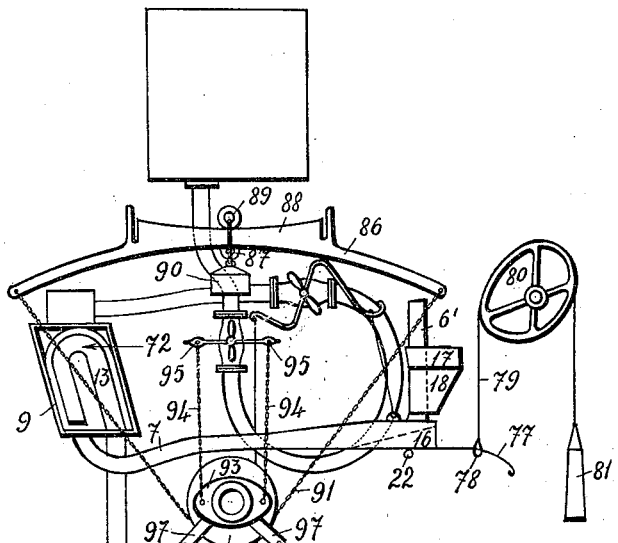

In Fig. 2 is shown one of the forms for carrying out this principle. According to this embodiment a hook —73— is attached to the weight —5′—. When the descent of the hydraulic counterpoise takes place too abruptly an auxiliary weight —74— is attached to the weight —5′— by means of the above mentioned hook —23—. In consequence of this the descent of the hydraulic counterpoise is rendered less rapid, so that before the descent has caused the closing of the key the water has been able to reach the level desired. Inversely, one of the weights is taken away the fixed weight being under pressure to make it descend more rapidly. Another means for lessening the rapidity of the descent of the counterpoise —6— and render the control softer at the same time is also represented in Figs. 2 and 5, and consists in attaching the weight —5′— to the arm —75— of the control lever —4— of the key by means of a lengthened eye —76—. It will be seen that at the beginning of the descent of the counterpoise —6— (as shown in Fig. 5) the lever arm of the weight —5′— is increased, and therefore the lowering of the said counterpoise —6— is decreased in rapidity. On the other hand this arm is decreased at the commencement of the pulling to raise the said counterpoise and thus attach the siphon pipe, and the pulling is thus rendered easier. The inverse will be made for rendering the action slower. A more efficacious brake on the descent of the hydraulic counterpoise, which allows the level of the water in the distributing tank or reservoir —9— to arrive at the height desired with more precision which is mainly required in railway and marine transports in order that the receiver should not overflow during the oscillations through being too full, is shown in Figs. 6 and 9. According to what is shown there the counterpoise —6— is attached to a shaft or rigid metal wire —77— to the end of which is attached by means of a hook —78— a rope —79— which winds over a pulley —80—. The pulley —80— is not circular but almost elliptic and is poised eccentrically so that at the beginning of the descent of the counterpoise —6— the lever arm of the opposing weight —81— is longer. Consequently in this case also the descent takes place more slowly at the beginning and more rapidly toward the end, in order to cause the perfect closing of the key. Vice versa the pulling to raise the hydraulic counterpoise is much softer, in the beginning. It may be that the key —3— may offer too much resistance to being turned and may become stuck. This will be due either to expansion caused by heat, or through rusting or some other cause. In this case the opposite inconvenience would take place, namely, that the counterpoise —6— would be too troublesome to lower, meeting the resistance of the key, and in this case also too much water would be uselessly wasted. In order to obviate this inconvenience the casing 82 of the key (Fig. 8) is formed with orifices 83 and with nipples 84 having screw stoppers —85— the outer edges of which are toothed in order that they may be easily turned. By twisting these stoppers the grease which is contained in them runs through the holes —83— on to the key. By causing this to revolve with a maneuver of the key the grease spreads over the whole surface thus diminishing the friction which prevents the rotation without its being dismounted as is generally done.

For the application of the device to marine vessels it is also advisable to introduce another very important modification. This modification shown in Fig. 9 has also the scope of causing the closing of the key whenever the charge should be likely to take place through the oscillations or rolling of the ship either by the spontaneous attachment of the siphon pipe or by the displacement of the hydraulic counterpoise consequent on the said oscillation. In this case, as shown in Fig. 9, an arched lever —86— is arranged poised in its center —87—. This lever bears on its upper part a guide —88— with two stops at the ends, on which guide a roller —89— may be run. Attached to the under part of the roller by means of a yoke is a weight —90—. The two ends of the lever —86— are attached by means of a chain —91— which extends around a pulley —92— placed vertically under the bearing —87— of the lever —86—. On the shaft of this pulley —92— is fastened an elliptic piece —93— which acts as a lever, with its greater axis horizontal, to the ends of which two small chains —94— are attached which by means of a lever —95— work a key —96— mounted in the piping above the key worked by the hydraulic counterpoise. Thus with the oscillations of the ship the roller —89— runs on the guide —88— and on account of the weight —90— attached to it turns the lever —86— now in one direction and now in another. The pulley —92— consequently revolves now in one direction and now in another and the key —96— is closed or opened. In order that it may be kept open during the use of the water-closet, another lever —97— is mounted on the shaft of the pulley —92—, the chain —99— being attached to the ends of the former by means of the two branches —98—. This chain —99—, as seen in Fig. 9ª is lengthened until it reaches under the seat and is attached to the end of a lever —100— fixed to the other end of a wheel —101— operatively connected to the seat. Over this wheel —101— extends another chain —102—, from one end of which hangs the weight —103—. The other end of it is attached to the seat, passing first under a suitable return pulley —104—. Whenever any one sits on the seat the pulley —104— is lowered and is consequently caused to rotate by the weight —103— from the chain —102— turning around it. In consequence the lever —100— which is fixed to it also rotates and draws down the chain —99—. The pulley —92— thus is prevented from revolving or if it is displaced from the corresponding position to the opening of the key —96— is returned to this position. The said key thus remains open.

What I claim is:

1. An apparatus of the character described, including a distribution tank, a siphon therein, a source of supply therefor provided with a controlling key, a water receiver having a movable connection and communicating with said tank, and operatively connected to said key and provided with an aerator, and means connected to said key for actuating the latter in opposition to said receiver.

2. An apparatus of the character described, including a distribution tank, a siphon therein, a source of supply for said tank provided with a controlling key, a counterpoised receiver operatively connected to said key and communicating with said tank, a valve interposed between the source of supply and said key and gravity controlled means operatively connected to said valve to control the latter.

3. An apparatus of the character described, including a distribution tank, a siphon therein, a source of supply for said tank provided with a controlling key, a counterpoised receiver operatively connected to said key and communicating with said tank, a valve interposed between the source of supply and said key, gravity controlled means operatively connected to said valve to control the latter, and means for holding said last named means inoperative.

4. An apparatus of the character described including a distribution tank, a siphon therein, a source of supply for said tank provided with a controlling key, a counterpoised receiver, operatively connected to said key and communicating with said tank, a valve interposed between the source of supply and said key gravity controlled means operatively connected to said valve to control the latter and a rolling connection for said valve, a support therefor and a relatively rigid connection between said valve connection and said support.

5. An apparatus of the character described, including a distribution tank, a siphon therein, a source of supply for said tank provided with a controlling key, a counterpoised receiver operatively connected to said key and communicating with said tank, a valve interposed between the source of supply and said key, gravity controlled means operatively connected to said valve to control the latter, a lever controlling said valve, a guide, a rolling support, movable on said guide and operatively connected to said lever, and means for moving said valve according to the position of the rolling support relative to the guide.

6. An apparatus of the character described including a distribution tank, a siphon therein, a source of supply for said tank provided with a controlling key, a counterpoised receiver operatively connected to said key and communicating with said tank, a valve interposed between the source of supply and said key, gravity controlled means operatively connected to said valve to control the latter, and means for holding said last named means inoperative.

7. An apparatus of the character described, including a distribution tank, a siphon therein, a counterpoised receiver, operatively connected to and communicating with said tank, a supply for said tank provided with a key, said receiver being operatively connected to said key, a connection between the source of supply and said key, provided with a valve, a rocking guide, a roller freely mounted on said guide and connected to said connection, a lever controlling the valve of said connection, a rocking element having a flexible connection with said guide, and also connected to said lever, and means for holding said rocking element relatively stationary.

In witness whereof I, the said FORTUNATO BERARDI, have signed this specification at Naples in the Kingdom of Italy, November 1911.

FORTUNATO BERARDI.

In the presence of two witnesses—
GIOVANNI BALSAMA,
MOTTES PUYLIESE.